United States Patent [19]

Caceres

[11] Patent Number: 4,846,491
[45] Date of Patent: Jul. 11, 1989

[54] BICYCLE KICKSTAND FOOT

[76] Inventor: Jose L. Caceres, 904 S. Sycamore Ave., Los Angeles, Calif. 90036

[21] Appl. No.: 226,390

[22] Filed: Aug. 1, 1988

[51] Int. Cl.⁴ .............................................. B62H 1/00
[52] U.S. Cl. ..................................... 280/301; 280/293
[58] Field of Search ................. 280/296, 301, 298, 304

[56] References Cited

U.S. PATENT DOCUMENTS 2,835,508  5/1958  Wood et al. ......................... 280/301
4,119,327 10/1978  Emerson .............................. 280/293

Primary Examiner—Charles A. Marmor
Assistant Examiner—Donn McGrehan

[57] ABSTRACT

An improved vehicle kickstand foot comprising a clamp member for securing said kickstand foot to said kickstand, and an elongated, generally U-shaped member pivotally secured to said clamp member and movable between an extended position projecting laterally to said kickstand to distribute the weight of said vehicle on a soft surface and a retracted position lying substantially parallel to said kickstand to minimize wind resistance and snagging when the vehicle is in motion.

7 Claims, 3 Drawing Sheets

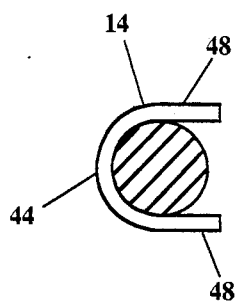
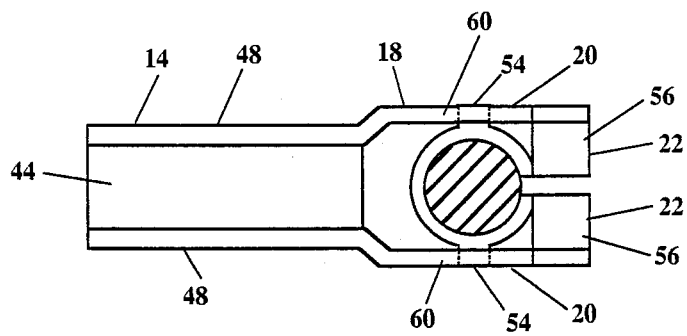
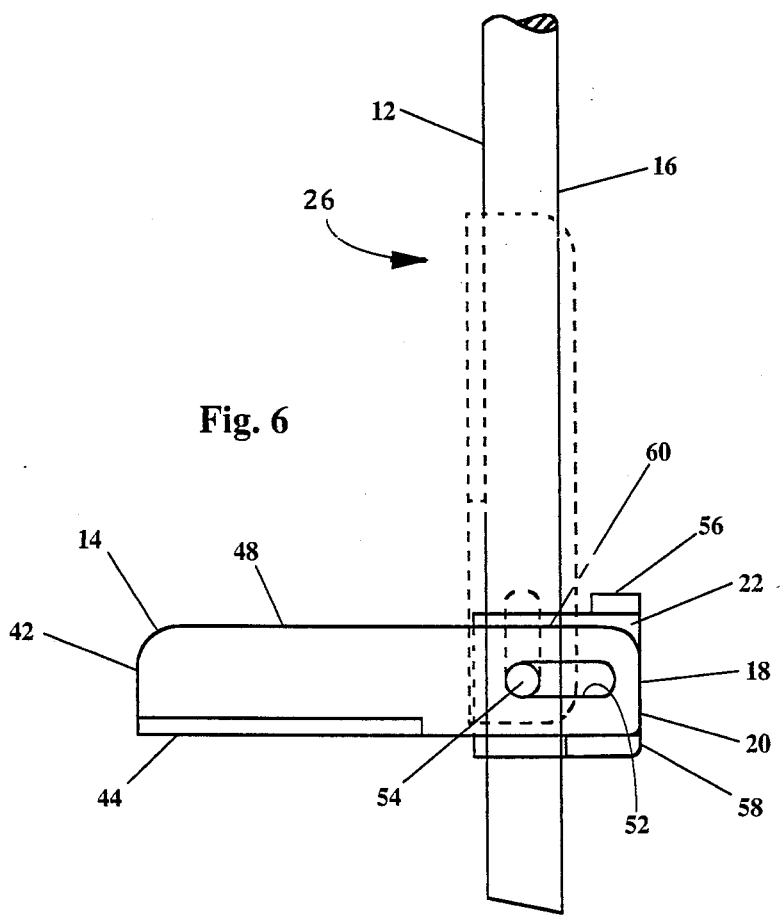

BICYCLE KICKSTAND FOOT

BACKGROUND

1. Field of Invention

This invention relates to bicycles and is particularly directed to a retractable foot for the kickstand of a bicycle, motorcycle or the like to facilitate parking the bicycle in mud, sand and the like.

2. Prior Art

With two-wheeled vehicles, such as bicycles, motorcycles and the like, it is common to provide a kickstand to facilitate parking. Conventionally, the kickstand comprises a shaft which is mounted on the frame of the vehicle and is movable between an extended position, for use in parking the vehicle, and a retracted position, wherein the kickstand provides minimal wind resistance during movement of the vehicle and is less likely to snag passing objects. Frequently, the kickstand is merely a rod or shaft which is pivotally secured to the frame of the vehicle and which lies generally parallel to the frame of the vehicle, in the retracted position, and swings downwardly and outwardly, in use, to form an angle of about 60° with the vertical axis of the vehicle and to support the vehicle in a generally upright position when the outer end of the kickstand is rested on the ground. Unfortunately, when the ground surface is soft, as with mud or sand, the weight of the vehicle often causes the end of the kickstand to penetrate the ground with the result that it fails to support the vehicle and the vehicle cannot be made to stand alone. To overcome this problem, it has been proposed to provide enlarged feet mountable on the outer end of the kickstand to spread the weight of the vehicle over an area larger than that of the kickstand alone and, hence, to provide greater stability for vehicles supported thereby. However, these enlarged feet provide considerable wind resistance when the vehicle is in motion and are highly susceptible to snagging passing objects which can cause damage to the vehicle or to the object snagged and could result in serious injury to bystanders or to the rider of the vehicle.

A search in the U.S. Patent Office has revealed the following prior art:

| U.S. Pat. No. | INVENTOR | ISSUED |
| --- | --- | --- |
| 3,955,829 | T. M. Bussler | May 11, 1976 |
| 4,457,530 | C. T. Johnson | Jul. 3, 1984 |
| 4,521,031 | R. M. Huth | Jun. 4, 1985 |
| 4,625,987 | B. I. Marsh | Dec. 2, 1986 |

The Bussler, Johnson and Huth patents each disclose an enlarged foot for a bicycle kickstand, substantially as described above. The Marsh patent discloses a thin, flat plate which is attached to the vehicle by means of a chain and which is intended to be placed beneath the end of the kickstand, when needed, to distribute the vehicle weight over a larger area for support on soft ground. However, when not in use, this plate will swing freely on its chain and can easily cut or snag passing objects or even the leg of the vehicle rider. Thus, none of the prior art kickstand feet have been entirely satisfactory.

BRIEF SUMMARY AND OBJECTS OF INVENTION

These disadvantages of prior art kickstand feet are overcome with the present invention and an improved kickstand foot is provided which can be extended laterally to the kickstand, when needed, to provide greater support area and which can be retracted, when not in use, to lie parallel to the kickstand to minimize wind resistance and possible snagging.

The advantages of the present invention are preferably attained by providing an improved vehicle kickstand foot comprising a clamp member for securing the kickstand foot to the kickstand, and an elongated generally U-shaped member pivotally secured to the clamp member and movable between an extended position projecting laterally to said kickstand to distribute the weight of said vehicle on a soft surface and a retracted position lying substantially parallel to said kickstand to minimize wind resistance and snagging when the vehicle is in motion.

Accordingly, it is an object of the present invention to provide an improved foot for a vehicle kickstand.

Another object of the present invention is to provide an improved foot for a vehicle kickstand which can be extended to distribute the weight of the vehicle on a soft surface and which can be retracted to minimize wind resistance and snagging when the vehicle is in motion.

A specific object of the present invention is to provide an improved vehicle kickstand foot comprising a clamp member for securing said kickstand foot to said kickstand, and an elongated, generally U-shaped member pivotally secured to said clamp member and movable between an extended position projecting laterally to said kickstand to distribute the weight of said vehicle on a soft surface and a retracted position lying substantially parallel to said kickstand to minimize wind resistance and snagging when the vehicle is in motion.

These and other objects and features of the present invention will be apparent from the following detailed description, taken with reference to the figures of the accompanying drawings.

BRIEF DESCRIPTION OF THE DRAWINGS

FIG. 3 is a transverse sectional view through the kickstand foot of FIG. 1, taken on the line 3—3 of FIG. 1;

FIG. 6 is a view, similar to that of FIG. 1, showing a further alternative form of the kickstand foot of FIG. 1; and FIG. 7 is a view, similar to that of FIG. 2, showing the kickstand foot of FIG. 6.

DETAILED DESCRIPTION OF THE INVENTION

Figure 1:
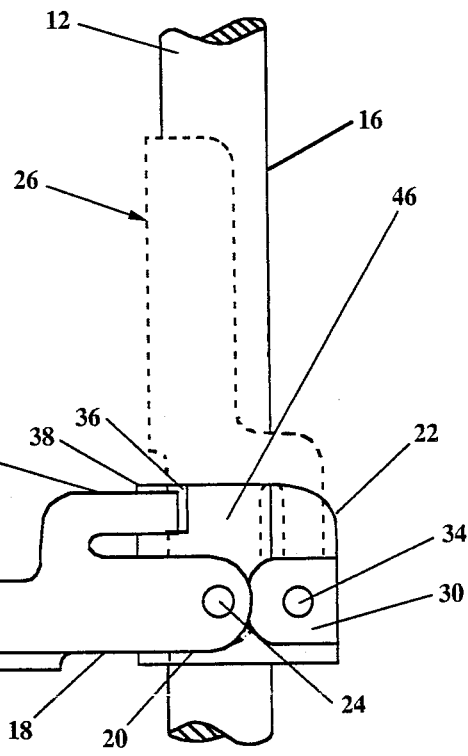
FIG. 1 is a side view showing a kickstand foot embodying the present invention attached to a vehicle kickstand.

In that form of the present invention chosen for purposes of illustration in FIG. 1, a vehicle kickstand 12 is shown having a kickstand foot 14 mounted thereon embodying the present invention. As is well known, the vehicle kickstand 12 comprises an elongated rod or shaft 16, of generally circular cross-section, having one end thereof, not shown, pivotally mounted on the frame of the vehicle for movement between a retracted position, in which the kickstand lies substantially parallel with that portion of the vehicle frame, and an extended position, in which the kickstand extends outwardly and downwardly at an angle of about 60° with the vertical axis of the vehicle, to support the vehicle when it is parked.

Figure 2:
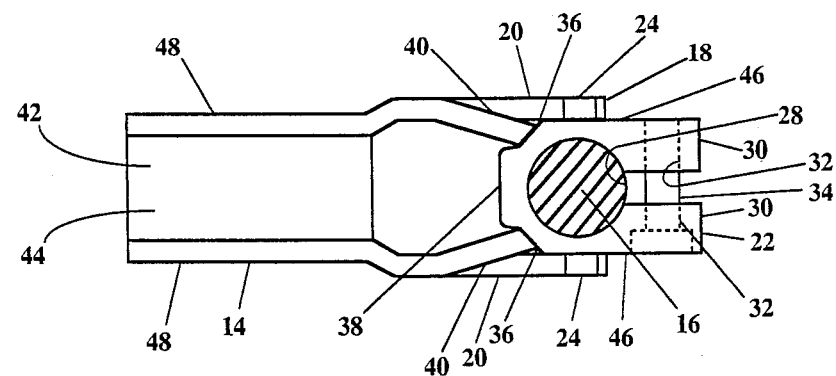
FIG. 2 is a plan view of the kickstand foot of FIG. 1.

As seen in FIGS. 1, 2 and 3, the kickstand foot 14 comprises an elongated, generally U-shaped member having a bifurcated end 18 formed with a pair of lower arms 20 that are pivotally secured to a suitable clamp member 22 by pins 24 to permit the kickstand foot 14 to be rotated between a retracted position, indicated in dashed lines at 26 in FIG. 1, and an extended position, as seen in solid lines in FIG. 1, projecting laterally outward from the kickstand 12. The clamp member 22 is formed with a channel 28 extending vertically through the clamp member 22 and configured to substantially conform to the shape of the kickstand 12. The clamp member also includes a pair of flanges 30 having an aperture 32 extending laterally through the flanges 30 to receive a bolt 34 which serves to tighten the flanges 30 to secure the clamp member 22 to the kickstand 12. Opposite the flanges 30, the clamp member 22 is formed with a pair of inwardly inclined surfaces 36 on either side of a central boss 38. The bifurcated end 18 of the kickstand foot 12 is formed with a pair of upper arms 40 which project inwardly to resiliently engage the inclined surfaces 36 of the clamp member 22 to releasably lock the kickstand foot 14 in its extended position. In this position, end 42 of the kickstand foot 14 projects laterally outward from the kickstand 12 so that, if the vehicle is parked on a soft surface and the end, not shown, of the kickstand 12 sinks into surface, the bottom surface 44 of end 42 of the kickstand foot 14 will engage the surface and will provide an enlarged surface-engaging area which will serve to distribute the weight of the vehicle and will tend to prevent the kickstand 12 from sinking further into the surface and, hence, will enable the vehicle rider to successfully park the vehicle despite the soft surface.

When the vehicle rider desires to drive the vehicle, the kickstand foot 14 is moved to its retracted position, indicated by dashed lines 26 in FIG. 1, by applying upward pressure to end 44 of the kickstand foot 14 to force the upper arms 40 outwardly off of the inclined surfaces 36 of the clamp member 22 to lie along the lateral sides 46 of the clamp member 22. Preferably, the sidewalls 48 of the kickstand foot 14 are spaced apart a distance equal to or slightly greater than the diameter of the kickstand 12. This allows end 44 of the kickstand foot 14 to swing upwardly to a position substantially parallel with the kickstand 12 and permits the sidewalls 48 of the kickstand foot 14 to lie on either side of the kickstand 12. In this position, the kickstand foot 14 lies substantially parallel to the kickstand 12, as indicated in dashed lines at 26 in FIG. 1. Consequently, in this position, the kickstand foot 14 provides minimum wind resistance when the vehicle is driven and has little, if any, chance to snag passing objects.

Figure 4:
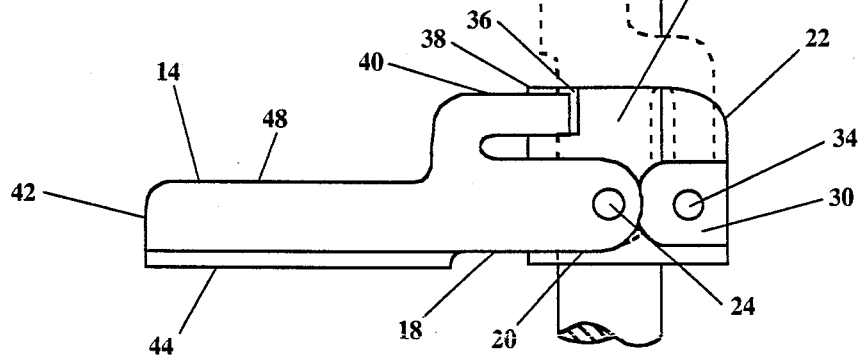
FIG. 4 is a view, similar to that of FIG. 1, showing an alternative form of the kickstand foot of FIG. 1.
Figure 5:
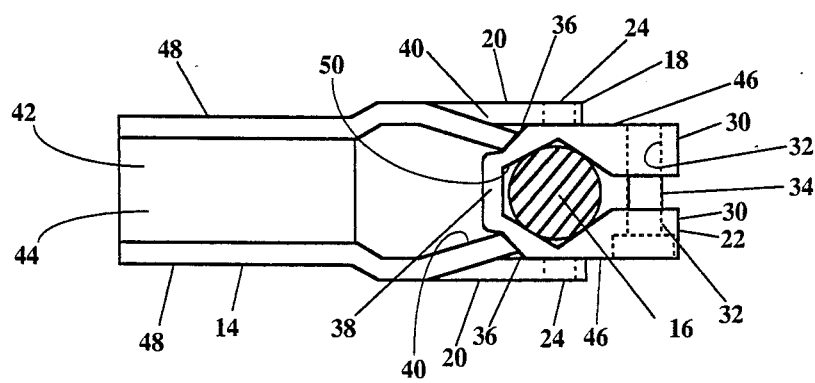
FIG. 5 is a view, similar to that of FIG. 2, showing the kickstand foot of FIG. 4.

FIGS. 4 and 5 illustrate an alternative form of the kickstand foot 14 embodying the present invention. This form of the kickstand foot 14 is substantially identical to that of FIGS. 1, 2 and 3 except that the vertical channel 28 through the clamp member 22 is formed with a hexagonal cross-section, as seen at 50 in FIG. 5. This form of the kickstand foot 14 is preferred for those instances where the kickstand 12 is not circular in cross-section and permits the clamp member 22 to securely clamp kickstands which are oval or irregularly shaped. Aside from the shape of the channel 28 the structure and operation of this form of the kickstand foot 14 is identical to that described above with respect to FIGS. 1, 2 and 3.

FIGS. 6 and 7 illustrate a further alternative form of the kickstand foot 14. In this form, end 18 of the kickstand foot 14 is modified in that the upper arms 40 are eliminated and the lower arms 20 are each formed with an elongated slot, as seen at 52 in FIG. 6, which receives a pin 54 that projects outwardly from the clamp member 22. This allows the foot 14 to pivot and slide on the clamp member 22, while the clamp member 22 secures the foot 14 to the kickstand 12. In addition, the clamp member 22 is formed with upper and lower outwardly projecting flanges 56 and 58. In use, the kickstand foot 14 is placed in the extended position by rotating the foot 14 outwardly and downwardly to a substantially horizontal position and is then pushed inwardly to cause the end 18 of the kickstand foot 14 to move between the upper and lower flanges 56 and 58 of the clamping member 22. Engagement of end 18 of the foot 14 with the flanges 56 and 58 of the clamping member 22 prevents vertical movement of the foot 14 and, hence, enables the foot 14 to provide a lateral extension for the kickstand 12 to prevent the end of the kickstand 12 from sinking into a soft surface. To move the vehicle, the vehicle rider mere draws the kickstand foot 14 forwardly to disengage end 18 from the flanges 56 and 58 of the clamping member 22, rotates the foot 14 upwardly and inwardly to lie parallel to the kickstand 12, as indicated an 26, and allows the foot 14 to drop so that pin 54 rests at the upper end of the slot 52. In this position, the upper surfaces 60 of the arms 20 will engage the edges of the flanges 56 and 58 to retain the foot 14 in the retracted position, indicated at 26, to provide minimum wind resistance and minimum likelihood of snagging passing objects.

Obviously, numerous variations and modifications may be made without departing from the spirit of the present invention. Therefore, it should be clearly understood that the forms of the present invention described above and shown in the accompanying drawings are illustrative only and are not intended to limit the scope of the present invention.

I claim:

1. A kickstand foot comprising:
    a clamp member for securing said foot to a vehicle kickstand, said clamp member having a central boss formed on one side thereof and having inwardly inclined surfaces formed on either side of said boss;
    an elongated, generally U-shaped member pivotally secured to said clamp member and movable between an extended position projecting laterally to said kickstand to distribute the weight of said vehicle on a soft surface and a retracted position lying substantially parallel to said kickstand to minimize wind resistance and snagging when the vehicle is in motion, one end of said elongated member being bifurcated and having openings formed in the arms of said bifurcated and;
    upper arms formed on each side of said bifurcated end of said elongated member, said arms projecting inwardly to resiliently engage said inclined surfaces of said clamp member to releasably lock said elongated member in its extended position; and pin means projecting outwardly from opposite sides of said clamp member and engaging the openings of the arms of said bifurcated end of said elongated member to pivotally secure said elongated member to said clamp member.

2. The kickstand foot of claim 1 wherein:

said elongated member is formed with the sidewalls thereof spaced apart as distance approximately equal to the diameter of said kickstand.

3. The kickstand foot of claim 1 wherein:

said clamp member is formed with a channel extending vertically therethrough to receive said kickstand.

4. The kickstand foot of claim 3 wherein:

said channel is circular in cross-section and is sized to correspond to the diameter of said kickstand.

5. The kickstand foot of claim 3 wherein:

said channel is hexagonal in cross-section.

6. The kickstand of claim 1 wherein:

said openings in said arms of said bifurcated end are elongated slots which permit sliding and pivoting motion of said elongated member with respect to said clamp member.

7. The kickstand foot of claim 6 further comprising:

flange means projecting outwardly from the upper and lower edges of said clamp member to releasably receive the ends of the arms of said bifurcated end of said elongated member.

* * * * *